United States Patent
Kim et al.

(10) Patent No.: US 8,509,245 B1
(45) Date of Patent: Aug. 13, 2013

(54) POLYMORPHIC ROUTING FOR DYNAMIC NETWORKS

(75) Inventors: Jae H. Kim, Bellevue, WA (US); Claudiu B. Danilov, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 12/944,993

(22) Filed: Nov. 12, 2010

Related U.S. Application Data

(60) Provisional application No. 61/261,580, filed on Nov. 16, 2009.

(51) Int. Cl.
*H04L 12/28* (2006.01)

(52) U.S. Cl.
USPC ......... 370/400; 370/366; 370/390; 370/395.5

(58) Field of Classification Search
USPC .............. 370/354, 238, 256, 366, 390, 395.5, 370/400
See application file for complete search history.

(56) References Cited

U.S. PATENT DOCUMENTS

| | | | |
|---|---|---|---|
| 7,058,018 B1 | 6/2006 | Hasty, Jr. et al. | |
| 7,177,295 B1 | 2/2007 | Sholander et al. | |
| 7,266,085 B2 | 9/2007 | Stine | |
| 7,369,512 B1 * | 5/2008 | Shurbanov et al. | 370/254 |
| 7,577,108 B2 * | 8/2009 | Zhang et al. | 370/255 |
| 7,609,672 B2 * | 10/2009 | Retana et al. | 370/328 |
| 8,159,955 B2 * | 4/2012 | Larsson | 370/238 |
| 8,194,541 B2 * | 6/2012 | Leppanen et al. | 370/230 |
| 8,345,555 B2 * | 1/2013 | Sendrowicz | 370/236 |
| 2002/0145978 A1 * | 10/2002 | Batsell et al. | 370/238 |
| 2005/0030921 A1 * | 2/2005 | Yau | 370/329 |
| 2005/0122955 A1 | 6/2005 | Lin et al. | |
| 2005/0157697 A1 | 7/2005 | Lee et al. | |
| 2008/0002640 A1 * | 1/2008 | Westphal | 370/338 |
| 2008/0008138 A1 * | 1/2008 | Pun | 370/338 |

FOREIGN PATENT DOCUMENTS

WO WO2009053954 * 4/2009

* cited by examiner

*Primary Examiner* — Ricky Ngo
*Assistant Examiner* — Dewanda Samuel
(74) *Attorney, Agent, or Firm* — Yee & Associates, P.C.

(57) ABSTRACT

A method, system, and computer program product for routing data in a network. The data is routed from a source in the network to a destination in the network along a path from the source to the destination through a plurality of nodes in the network using state information. The plurality of nodes forms the network and comprises static nodes and mobile nodes. In response to a loss of a route at a node in the mobile nodes, the node sends the data is sent to all other nodes in the plurality of nodes. Responses are received at the node from the destination through a number of paths from the destination to the node. Updated state information for the node is identified using the responses. The data is sent from the node to the destination along a selected route for the node using the updated state information.

28 Claims, 6 Drawing Sheets

POLYMORPHIC ROUTING FOR DYNAMIC NETWORKS

RELATED PROVISIONAL APPLICATION

This application is related to and claims the benefit of priority of provisional U.S. Patent Application Ser. No. 61/261,580, filed Nov. 16, 2009, entitled "Polymorphic Routing for Dynamic Networks", which is incorporated herein by reference.

GOVERNMENT LICENSE RIGHTS

This invention was made with Government support under contract number N-00014-08-C-0492 awarded by the United States Navy. The Government has certain rights in this invention.

BACKGROUND INFORMATION

1. Field

The present disclosure relates generally to networks and, in particular, to wireless networks. Still more particularly, the present disclosure relates to routing information through nodes in wireless networks.

2. Background

A wireless network is a group of nodes that is connected to each other through wireless communications links. Nodes in a wireless network may take a number of different forms. For example, nodes in a wireless network may include, without limitation, computers, personal digital assistants, servers, cellular phones, smart phones, routers, switches, gateways, firewalls, and/or other suitable types of devices capable of communicating wirelessly.

Additionally, these nodes may be associated with a number of different platforms. For example, without limitation, the nodes may be associated with mobile platforms, stationary platforms, aircraft, spacecraft, land-based structures, aquatic-based structures, and/or other suitable types of platforms.

Typically, wireless networks take the form of static networks, mobile networks, or a combination of the two. A static network is a network comprised of static nodes. Static nodes are nodes that are stationary. In other words, static nodes are nodes that have fixed locations and do not move. A mobile network is a network comprised of mobile nodes. Mobile nodes are nodes that may move to different locations. For example, a computer system on an unmanned aerial vehicle, a cellular phone, a personal digital assistant, and a computer system on a ship are examples of mobile nodes.

One type of mobile network is a mobile ad hoc network (MANET). A mobile ad hoc network is a self-configuring network of mobile devices connected by wireless communications links. Each device in a mobile ad hoc network is capable of moving independently in any direction. In other words, a mobile ad hoc network does not have a fixed infrastructure. In this manner, links from one device to other devices in the mobile ad hoc network change as the device moves.

Further, a mobile ad hoc network may be part of a larger network containing both static and mobile nodes. In some cases, a mobile ad hoc network is an extension of a wired network.

With a mobile ad hoc network, a central server is not present to control routing, security, data forwarding, discovery of neighboring nodes, and/or other processes. Identifying routes for forwarding data within the network may become more difficult as the mobile nodes in the network move.

Further, depending on how fast a mobile network is changing, routing data through the mobile network may require more time, processing power, resources, and/or effort than desired. Additionally, connectivity between mobile nodes may be sparser than desired, depending on how fast the network is changing.

Therefore, it would be advantageous to have a method and apparatus that takes into account one or more of the issues discussed above, as well as other possible issues.

SUMMARY

In one advantageous embodiment, a method is present for routing data in a network. The data is routed from a source in a plurality of nodes to a destination in the plurality of nodes along a path from the source to the destination through the plurality of nodes using state information for the plurality of nodes. The plurality of nodes forms the network and comprises a number of static nodes and a number of mobile nodes. In response to a loss of a route at a node in the number of mobile nodes, the data is sent to all other nodes in the plurality of nodes from the node. The route is a segment of the path. A number of responses is received at the node from the destination through a number of paths from the destination to the node. Updated state information for the node is identified for the plurality of nodes using the number of responses. The data is sent from the node to the destination along a selected route for the node using the updated state information.

In another advantageous embodiment, a system comprises a source in a plurality of nodes, a destination in the plurality of nodes in the network, and a node. The plurality of nodes forms a network and comprises a number of mobile nodes and a number of static nodes. Data is routed from the source to the destination along a path through the plurality of nodes in the network. The node is in the number of mobile nodes in the plurality of nodes. The node is configured to send the data to all other nodes in the plurality of nodes in the network in response to a loss of a route at the node. The route is a segment of the path. The node is configured to receive a number of responses at the node from the destination through a number of paths from the destination to the node. The node is configured to identify updated state information for the plurality of nodes using the number of responses. The node is also configured to send the data to the destination along a selected route using the updated state information.

In yet another advantageous embodiment, a computer program product for routing data in a network comprises a computer readable storage medium and program code, stored on the computer readable storage medium. Program code is present for, responsive to a loss of a route at a node in a plurality of nodes in the network, sending the data to all other nodes. The data is being routed along a path from a source in the plurality of nodes to a destination in the plurality of nodes. The plurality of nodes comprises a number of mobile nodes and a number of static nodes. The route is a segment in the path. Program code is present for receiving a number of responses at the node from the destination through a number of paths from the destination to the node. Program code is present for identifying updated state information for the plurality of nodes using the number of responses. Program code is present for sending the data to the destination along a selected route using the updated state information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
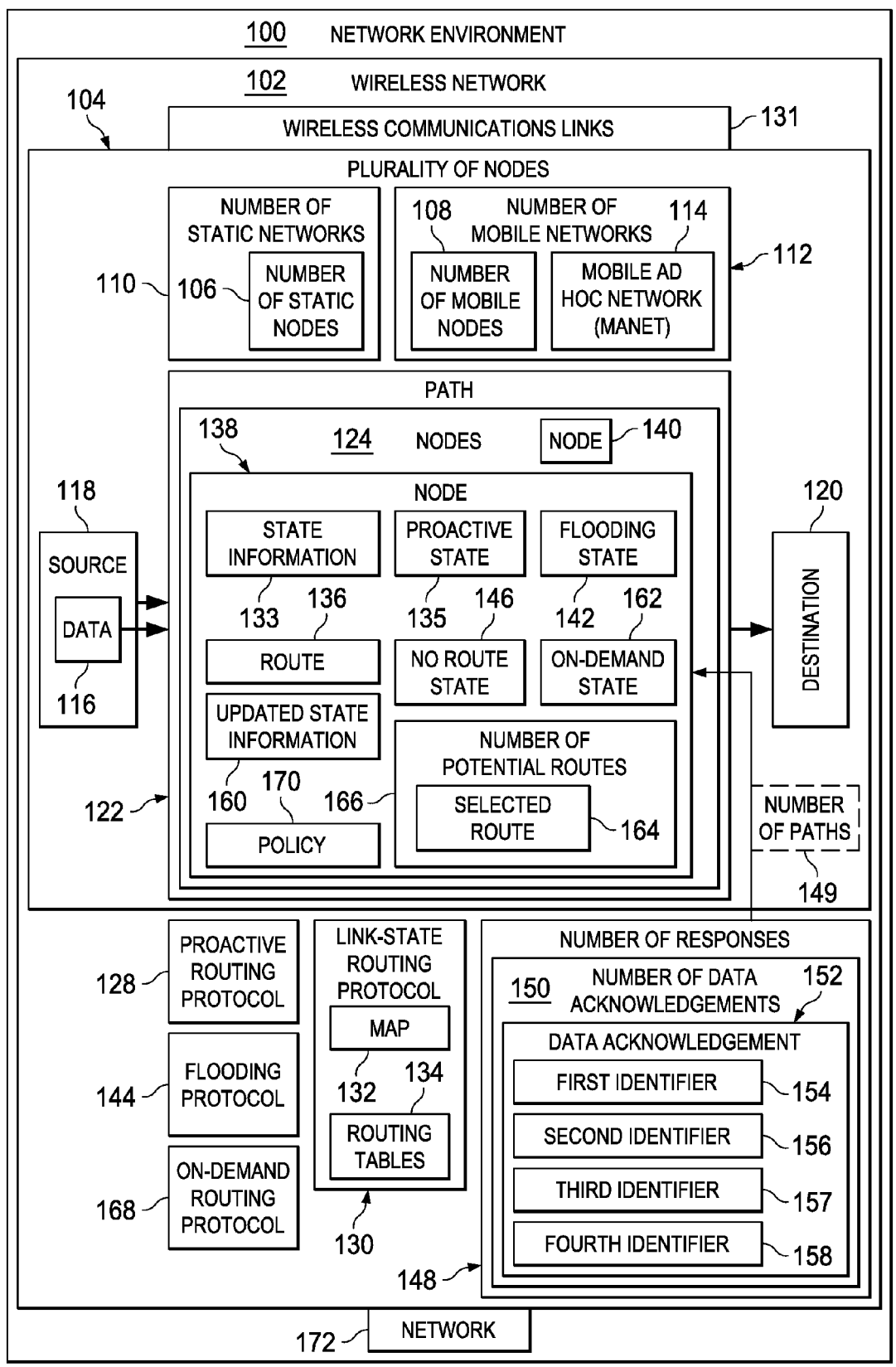
FIG. 1 is an illustration of a network environment in accordance with an advantageous embodiment.

The different advantageous embodiments recognize and take into account a number of different considerations. For example, the different advantageous embodiments recognize and take into account that with currently available methods for routing data in a wireless network, one routing protocol is required to be selected for all nodes in the wireless network prior to routing the data through the wireless network. The routing protocol is selected based on a number of different factors. For example, the routing protocol may be selected based on a known pattern of movement or predicted pattern of movement for the mobile nodes in the wireless network.

The different advantageous embodiments recognize and take into account that using one routing protocol for all nodes in a wireless network for routing data through the network may require more processing power, time, and/or resources than desired as movement of the mobile nodes in the network increases. Movement of the mobile nodes increases when the mobile nodes move to different locations more quickly. Further, the different advantageous embodiments recognize and take into account that with one routing protocol for all nodes in the wireless network, the wireless network may not be capable of modifying a path for the data to the destination in response to movement of the mobile nodes in the wireless networks as quickly as desired.

Additionally, the different advantageous embodiments recognize and take into account that movement of the mobile nodes may also cause connectivity between the nodes in the wireless network to be sparser than desired. For example, movement of the mobile nodes may result in a selected destination not receiving the data at the desired times.

The different advantageous embodiments recognize and take into account that it may be desirable to have a method for routing data in a wireless network that allows individual nodes to switch between different routing protocols in response to movement of mobile nodes in the wireless network. The different advantageous embodiments recognize and take into account that nodes configured to be in more than one state with respect to a destination to which data is to be sent may allow data to be routed to the destination with desired speed and/or at desired times.

Thus, the different advantageous embodiments provide a method, system, and computer program product for routing data in a network. In one advantageous embodiment, data is routed from a source in a plurality of nodes to a destination in the plurality of nodes along a path from a source to a destination through the plurality of nodes using state information for the plurality of nodes. The plurality of nodes forms a network and comprises a number of static nodes and a number of mobile nodes.

In response to a loss of a route at a node in the number of mobile nodes, the data is sent to all other nodes in the plurality of nodes from the node, wherein the route is a segment of the path. A number of responses is received at the node from the destination along a number of paths from the destination to the node. Updated state information for the plurality of nodes is identified using the number of responses. The data is sent from the node to the destination along a selected route for the node using the updated state information.

With reference now to FIG. 1, an illustration of a network environment is depicted in accordance with an advantageous embodiment. In these illustrative examples, network environment 100 is an example of an environment in which the different advantageous embodiments may be implemented. Network environment 100 includes wireless network 102. Wireless network 102 comprises plurality of nodes 104.

Plurality of nodes 104 may include, for example, without limitation, computers, personal digital assistants, servers, cellular phones, smart phones, routers, switches, gateways, firewalls, and/or other suitable types of devices capable of communicating wirelessly. Further, plurality of nodes 104 may be associated with platforms, such as mobile platforms, stationary platforms, aircraft, unmanned aerial vehicles, land-based structures, ground vehicles, buildings, aquatic-based structures, ships, and/or other suitable types of platforms.

In these depicted examples, plurality of nodes 104 includes number of static nodes 106 and number of mobile nodes 108. A number of, as used herein, when referring to items, means one or more items. For example, a number of nodes is one or more nodes.

Number of static nodes 106 may form number of static networks 110 within wireless network 102. Number of mobile nodes 108 may form number of mobile networks 112 within wireless network 102. As illustrated, one example of a mobile network in number of mobile networks 112 is mobile ad hoc network (MANET) 114.

In these illustrative examples, data 116 may be sent from source 118 in plurality of nodes 104 to destination 120 in plurality of nodes 104. In particular, data 116 may be sent from source 118 to destination 120 along path 122 through plurality of nodes 104 in wireless network 102. Path 122 includes nodes 124 in plurality of nodes 104.

Path 122 from source 118 to destination 120 may be identified in a number of different manners. As one illustrative example, path 122 is identified using proactive routing protocol 128. Proactive routing protocol 128 takes the form of, in these examples, link-state routing protocol 130.

Link-state routing protocol 130 uses map 132 of the connectivity of wireless network 102 to identify routing tables 134 for plurality of nodes 104. Map 132 identifies plurality of nodes 104 in wireless network 102 and wireless communications links 131 between plurality of nodes 104.

Each node in plurality of nodes 104 is associated with a routing table in routing tables 134. Each routing table identifies a path from the corresponding node to every possible destination in plurality of nodes 104. In these examples, the path is the shortest path. In some illustrative examples, the path may be selected by link-state routing protocol 130 based on a number of criteria.

As data 116 is sent from source 118 to destination 120, state information 133 for plurality of nodes 104 is monitored by plurality of nodes 104 with respect to destination 120. For example, for path 122 for sending data 116 to destination 120, the nodes in nodes 124 along path 122 that can receive and send data 116 using proactive routing protocol 128 are in proactive state 135. In other words, proactive state 135 is the state in which the nodes are able to identify which nodes are to be sent data 116, such that data 116 reaches destination 120. This identification may be made using, for example, map 132 and/or routing tables 134.

In some cases, a loss of route 136 occurs at a node in number of mobile nodes 108, such as at node 138. Route 136 is a segment of path 122. Route 136 is from node 138 to another node in nodes 124. In other words, route 136 is a hop. Loss of route 136 may occur for any number of reasons. As one illustrative example, loss of route 136 may occur when node 140 following node 138 along path 122 moves to a different location such that wireless communication between node 138 and the next node is not possible. Additionally, loss of route 136 may occur when node 138 is unable to identify a next node in path 122 to which to send data 116 such that data 116 reaches destination 120. Still further, loss of route 136 may occur when node 138 moves to a different location.

In response to a loss of route 136 at node 138, node 138 enters flooding state 142 with respect to destination 120. In these examples, node 138 changes from proactive state 135 to flooding state 142 when the loss of route 136 occurs. In some cases, nodes, such as node 138, which are unable to identify to which node in plurality of nodes 104 to send data 116, such that data 116 reaches destination 120, change from proactive state 135 to no route state 146 prior to entering into flooding state 142.

Flooding state 142 is a state for node 138 in which data 116 is sent to all other nodes in plurality of nodes 104. In other words, node 138 floods plurality of nodes 104 with data 116. Node 138 floods plurality of nodes 104 with data 116 using flooding protocol 144. In particular, node 138 floods plurality of nodes 104 with data 116 by broadcasting data 116 in wireless network 102 such that data 116 sent from node 138 reaches all other nodes in plurality of nodes 104.

In response to flooding plurality of nodes 104 with data 116, node 138 receives number of responses 148 at node 138 from destination 120 through number of paths 149 from destination 120 to node 138. Number of responses 148 takes the form of number of data acknowledgements 150 in these examples.

In these illustrative examples, each node in plurality of nodes 104 that receives data 116 from flooding of plurality of nodes 104 generates a data acknowledgement, such as data acknowledgement 152. Each node then floods plurality of nodes 104 with data acknowledgement 152. Data acknowledgement 152 includes first identifier 154, second identifier 156, third identifier 157, and fourth identifier 158.

First identifier 154 identifies source 118 for data 116. Second identifier 156 identifies destination 120 for data 116. Third identifier 157 identifies the node from which the data acknowledgement was received. For example, without limitation, if node 138 receives data acknowledgement 152 from node 159, third identifier 157 identifies node 159. Fourth identifier 158 is a sequence number for data 116 in these illustrative examples. The sequence number identifies which version of data 116 was received at the node identified in second identifier 156.

In response to receiving number of data acknowledgements 150, node 138 identifies updated state information 160 for plurality of nodes 104 using number of responses 148. Updated state information 160 identifies a change in state for node 138 for route 136 from flooding state 142 to one of proactive state 135 and on-demand state 162 with respect to destination 120. For example, node 138 changes to proactive state 135 for route 136 when node 138 uses number of data acknowledgements 150 to identify selected route 164 for sending data 116 to destination 120 using proactive routing protocol 128. Selected route 164 is from node 138 to another node in plurality of nodes 104 along a path from node 138 to destination 120.

Further, node 138 changes to on-demand state 162 when node 138 identifies number of potential routes 166 for sending data 116 to destination 120 using on-demand routing protocol 168. Each potential route is from node 138 to another node in plurality of nodes 104.

In these illustrative examples, on-demand routing protocol 168 includes any type of routing protocol that finds a path from a source to a destination as needed. For example, a path from node 138 to destination 120 is needed when node 138 receives data 116 that is to be sent to destination 120. In particular, a route from node 138 to a second node in plurality of nodes 104 is needed in which the second node is along a path to destination 120. On-demand routing protocol 168 does not use routing tables as compared to proactive routing protocol 128. In this manner, on-demand state 162 is a state for node 138 in which the node uses on-demand routing protocol 168.

Each of number of potential routes 166 is identified based on the paths to destination 120 having the same number of hops. A hop occurs when data 116 is sent from one node to another node.

Node 138 may enter on-demand state 162 when number of potential routes 166 has been identified for sending data 116 from node 138 to destination 120 prior to routing tables 134 for plurality of nodes 104 being updated such that a shortest path from node 138 to destination 120 may be identified.

When node 138 changes from flooding state 142 to one of proactive state 135 and on-demand state 162, node 138 sends data 116 to destination 120 using selected route 164. Selected route 164 may be the segment of the path identified using proactive routing protocol 128 or a route selected from number of potential routes 166. In these examples, selected route 164 may be selected from number of potential routes 166 randomly or using policy 170. Policy 170 includes a number of rules and/or criteria for selecting a route from node 138 to destination 120.

In these illustrative examples, each node in plurality of nodes 104 may be in one of proactive state 135, flooding state 142, no route state 146, or on-demand state 162 with respect to destination 120. Each time a loss of route 136 occurs at a node in nodes 124 along path 122, plurality of nodes 104 is flooded with data 116 until the node can identify a selected route for sending data 116 to destination 120 using proactive routing protocol 128 or on-demand routing protocol 168.

The illustration of network environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, wireless network 102 may be an extension of network 172. Network 172 may be a wired network in these illustrative examples.

Figure 2:
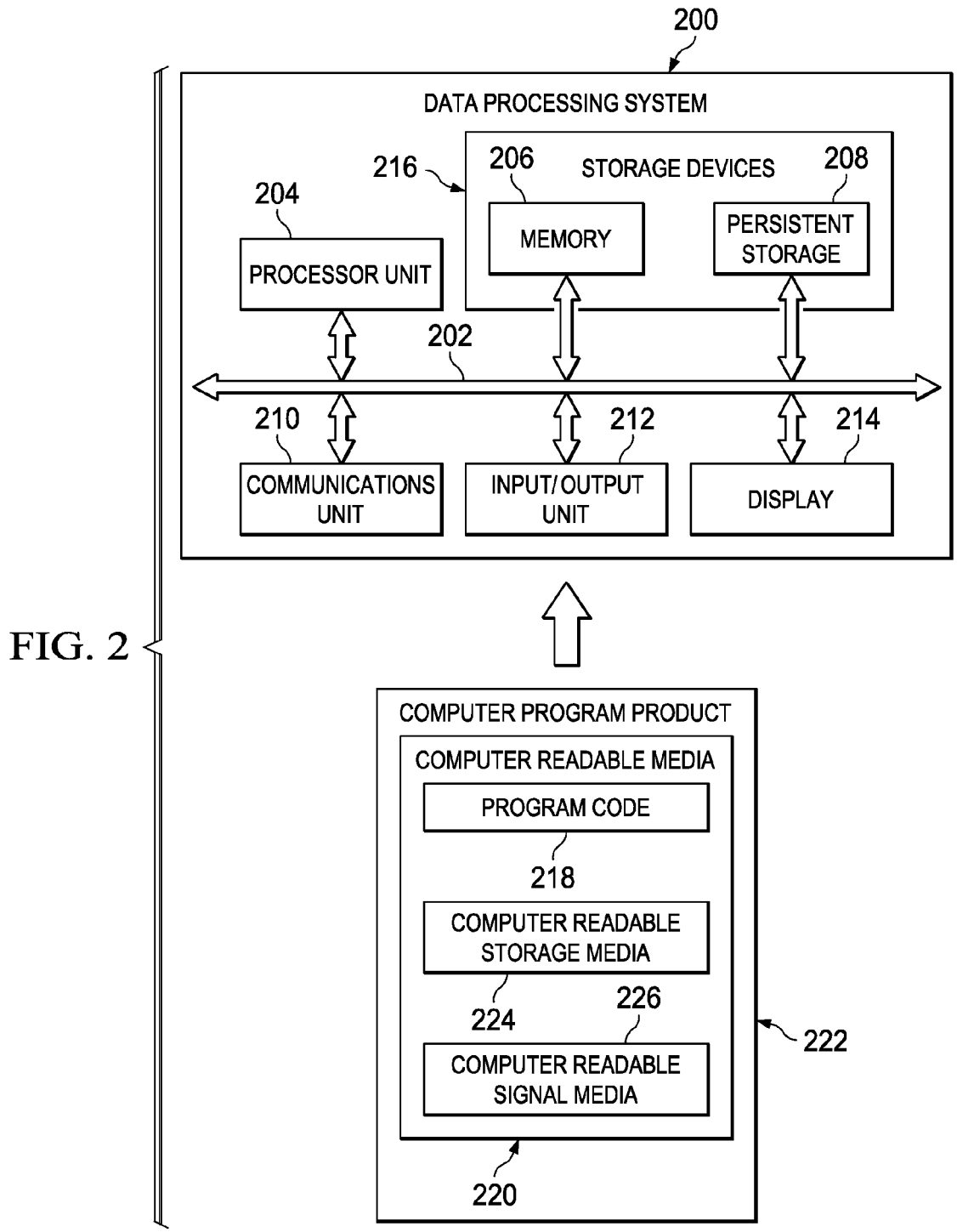
FIG. 2 is an illustration of a data processing system in accordance with an advantageous embodiment.

Turning now to FIG. 2, an illustration of a data processing system is depicted in accordance with an advantageous embodiment. In this illustrative example, data processing system 200 is an example of one implementation for a node in plurality of nodes 104 in FIG. 1. Data processing system 200 may be, for example, a cellular phone, a computer, a personal digital assistant, a processor unit in an unmanned aerial vehicle, a computer system in a ship, or some other suitable type of system configured to communicate wirelessly.

As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
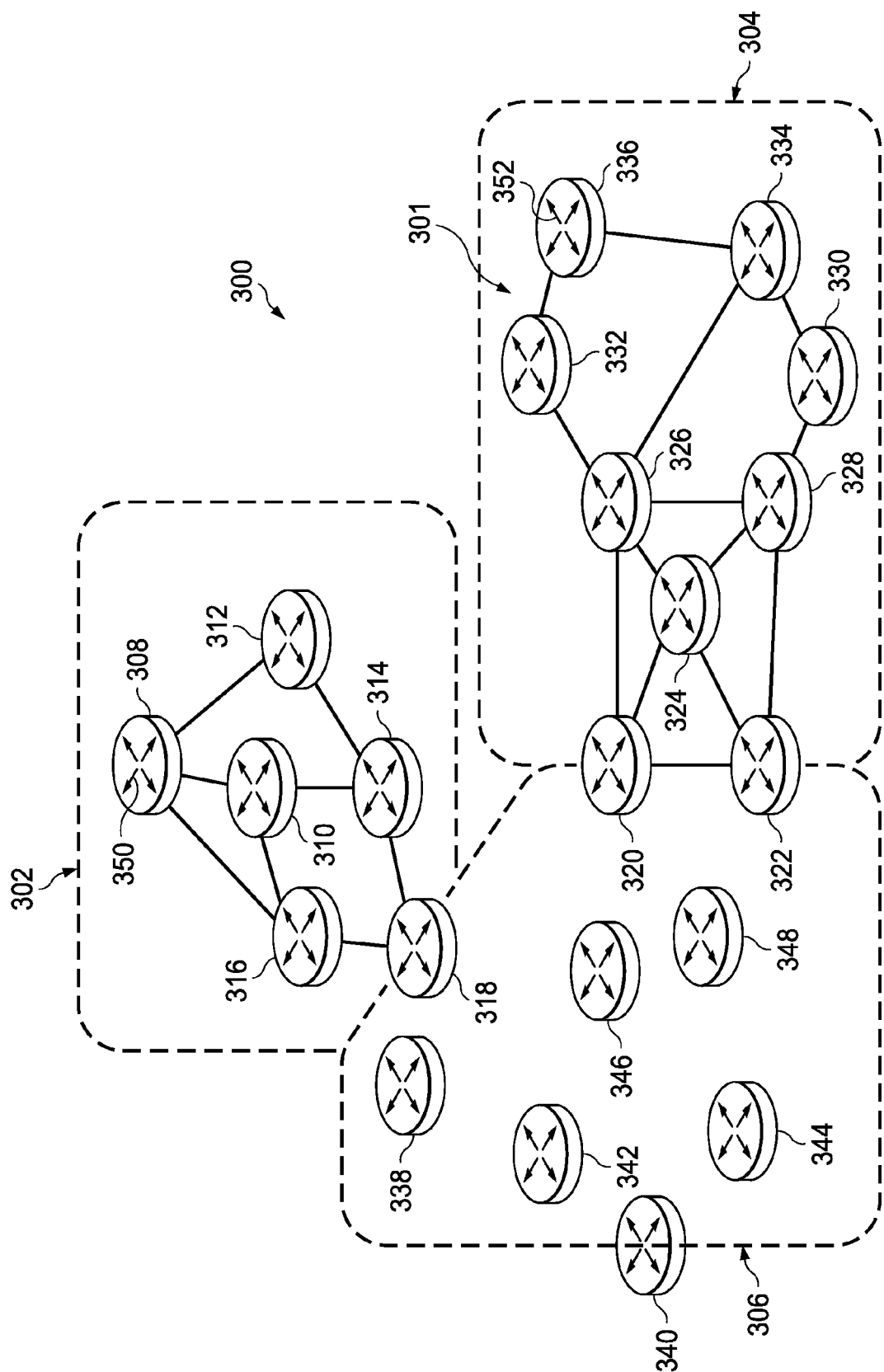
FIG. 3 is an illustration of a wireless network in accordance with an advantageous embodiment.

With reference now to FIG. 3, an illustration of a wireless network is depicted in accordance with an advantageous embodiment. In this illustrative example, wireless network 300 is an example of one implementation for wireless network 102 in FIG. 1. As depicted, wireless network 300 is formed by plurality of nodes 301. Plurality of nodes 301 form static network 302, static network 304, and mobile ad hoc network 306.

In this illustrative example, static network 302 includes static nodes 308, 310, 312, 314, 316, and 318. Static network 304 includes static nodes 320, 322, 324, 326, 328, 330, 332, 334, and 336. As depicted, the connectivity of static nodes in static network 302 and static network 304 is known. The connectivity of two nodes is the wireless communications link that connects two nodes.

Mobile ad hoc network 306 includes mobile nodes 338, 340, 342, 344, 346, and 348. As illustrated, the connectivity of mobile nodes in mobile ad hoc network 306 may not be known. For example, the configuration of the mobile nodes in mobile ad hoc network 306 may be at least one of continuously changing, changing in response to a periodic event, and changing in response to a non-periodic event.

Static node 308 may be source 350. Static node 336 may be destination 352. Data may be routed from source 350 to destination 352. As data is sent from source 350, a loss of route may occur at a node in mobile ad hoc network 306, such as mobile node 342. In response to this loss of route, mobile node 342 may flood plurality of nodes 301 in wireless network 300 with the data until a selected route for sending the data from mobile node 342 to destination 352 can be identified using a proactive routing protocol or an on-demand routing protocol. The selected route may be identified based on a number of responses received from destination 352 along a number of paths from destination 352 to the node.

Figure 4:
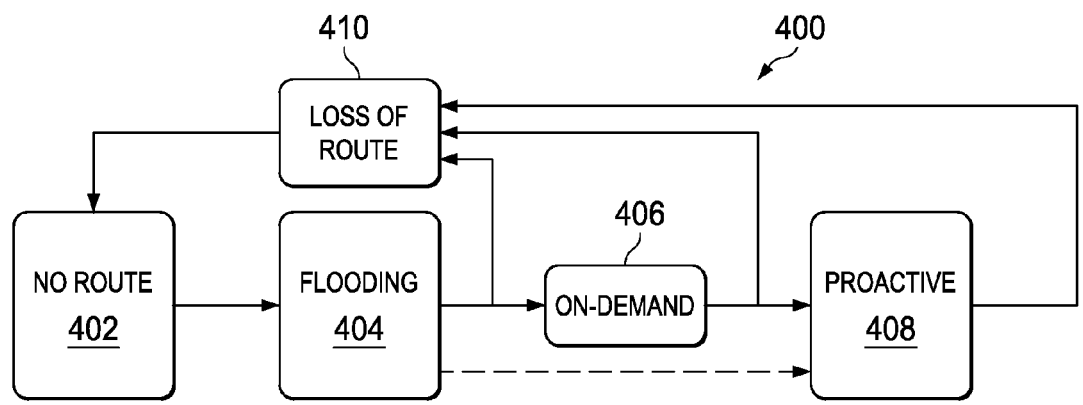
FIG. 4 is an illustration of a state diagram in accordance with an advantageous embodiment.

With reference now to FIG. 4, an illustration of a state diagram is depicted in accordance with an advantageous embodiment that shows the general state diagram of an adaptive routing protocol. The state of the routing protocol is defined per destination, at each node. A certain router may have a link state route to a destination, while it may not have a route to another destination, for which it may prefer to flood data packets. For a certain destination, different nodes in the network may be in different states at a certain time. In this illustrative example, state diagram 400 identifies different states for a particular node in a plurality of nodes in a network with respect to a destination to which data is being sent. The particular node may be, for example, a node in number of mobile nodes 108 in plurality of nodes 104 in FIG. 1.

As illustrated, the node may be in no route state 402, flooding state 404, on-demand state 406, or proactive state 408. When loss of route 410 occurs at the node, the node enters no route state 402 and then flooding state 404. No route state 402 is a transitional state in these examples. Loss of route 410 may be, for example, loss of route 136 in FIG. 1.

In flooding state 404, the node floods all other nodes in the network with the data to be sent to the destination until the node can reach one of on-demand state 406 and proactive state 408. In other words, the network is flooded with the data until a selected route can be identified using an on-demand routing protocol or a proactive routing protocol.

Figure 5:
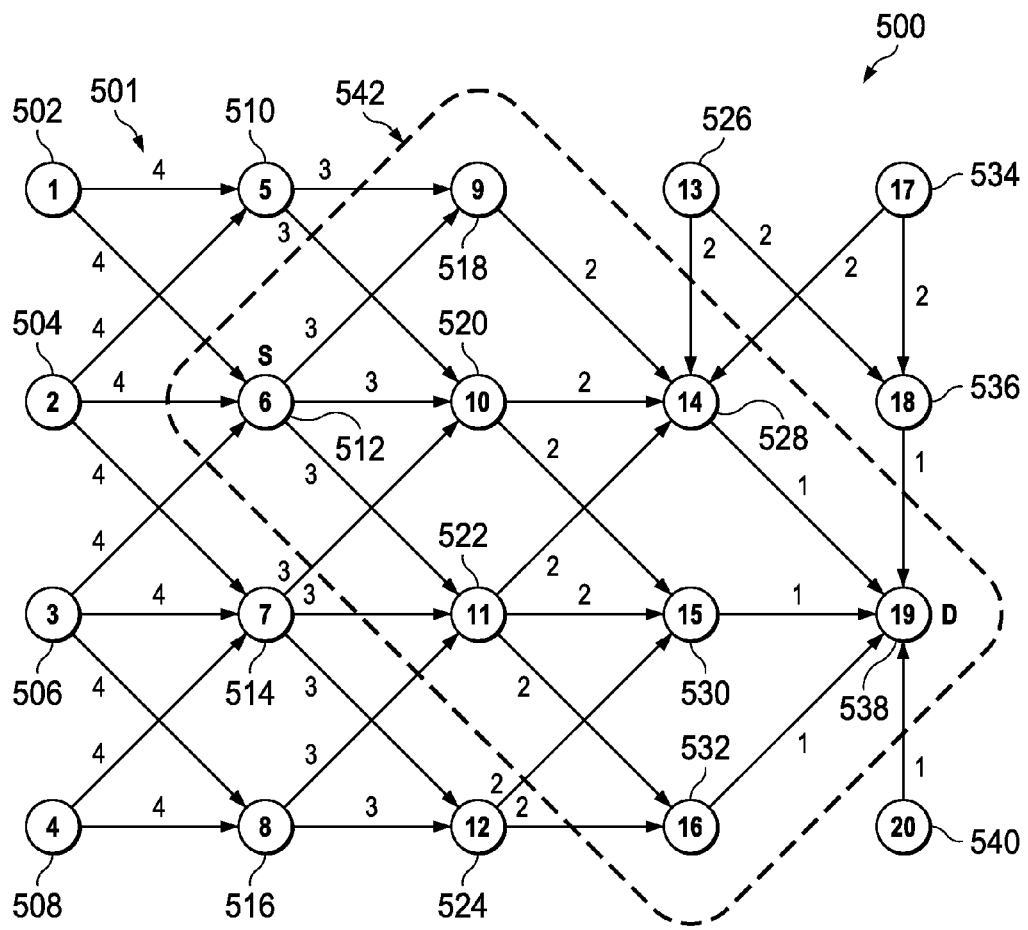
FIG. 5 is an illustration of a wireless network in accordance with an advantageous embodiment.

With reference now to FIG. 5, an illustration of a wireless network is depicted in accordance with an advantageous embodiment. In this illustrative example, wireless network 500 is an example of one implementation for wireless network 102 in FIG. 1. As depicted, wireless network 500 comprises plurality of nodes 501.

In this depicted example, plurality of nodes 501 includes nodes 502, 504, 506, 508, 510, 512, 514, 516, 518, 520, 522, 524, 526, 528, 530, 532, 534, 536, 538, and 540. A first portion of plurality of nodes 501 are static nodes, and a second portion of plurality of nodes 501 are mobile nodes. In this illustrative example, node 512 is a source for data that is to be routed through wireless network 500 to node 538. Node 538 is the destination for the data. As illustrated, portion 542 of wireless network 500 identifies all nodes that may be used to route the data from node 512, the source, to node 538, the destination. In other words, portion 542 identifies the nodes that may form a number of potential paths for routing data from node 512 to node 538.

In this illustrative example, each of the potential paths that may be used with the nodes in portion 542 contains the same number of hops. In particular, each of the potential routes contains three hops. One illustrative example of routing data from node 512 to node 538 is sending data from node 512 to node 522, from node 522 to node 530, and from node 530 to node 538.

In this depicted example, if a loss of route occurs at a node along the route to the destination, the node floods plurality of nodes 501 with the data and waits to receive responses from the destination. For example, a loss of route may occur at node 522. This loss of route may occur due to another node to which node 520 was to send the data moving. When the other node moves, node 520 is no longer able to identify the node. In other words, when node 522 receives the data, node 522 may not know to which node in portion 542 to send the data such that the data reaches the destination, node 538. Node 522 then floods plurality of nodes 501 with the data such that the data reaches node 538.

When node 538 receives the data, node 538 floods plurality of nodes 501 with a data acknowledgement. In other words, node 538 sends out a data acknowledgment to all neighboring nodes. For example, node 538 sends out a data acknowledgement to node 536, node 530, and node 540. These nodes then, in turn, send out the data acknowledgement to their neighboring nodes. In this manner, node 522 may receive a number of data acknowledgements from the destination, node 538, along a number of paths from node 538 to node 522.

In response to receiving the number of data acknowledgements, node 522 identifies updated state information for plurality of nodes 501. The updated state information may be identified using routing tables, for example. Further, node 522 uses the number of data acknowledgements to switch from flooding plurality of nodes 501 to sending the data to the destination along a selected route using one of a proactive routing protocol and an on-demand routing protocol.

Node 522 uses the updated state information to identify a number of potential routes for the data. In other words, node 522 identifies a number of other nodes to which to send the data such that the data reaches the destination. In this illustrative example, node 522 may identify a selected route for the data as node 528. This selected route is one segment along a path for the data from node 522 to node 538.

Figure 6:
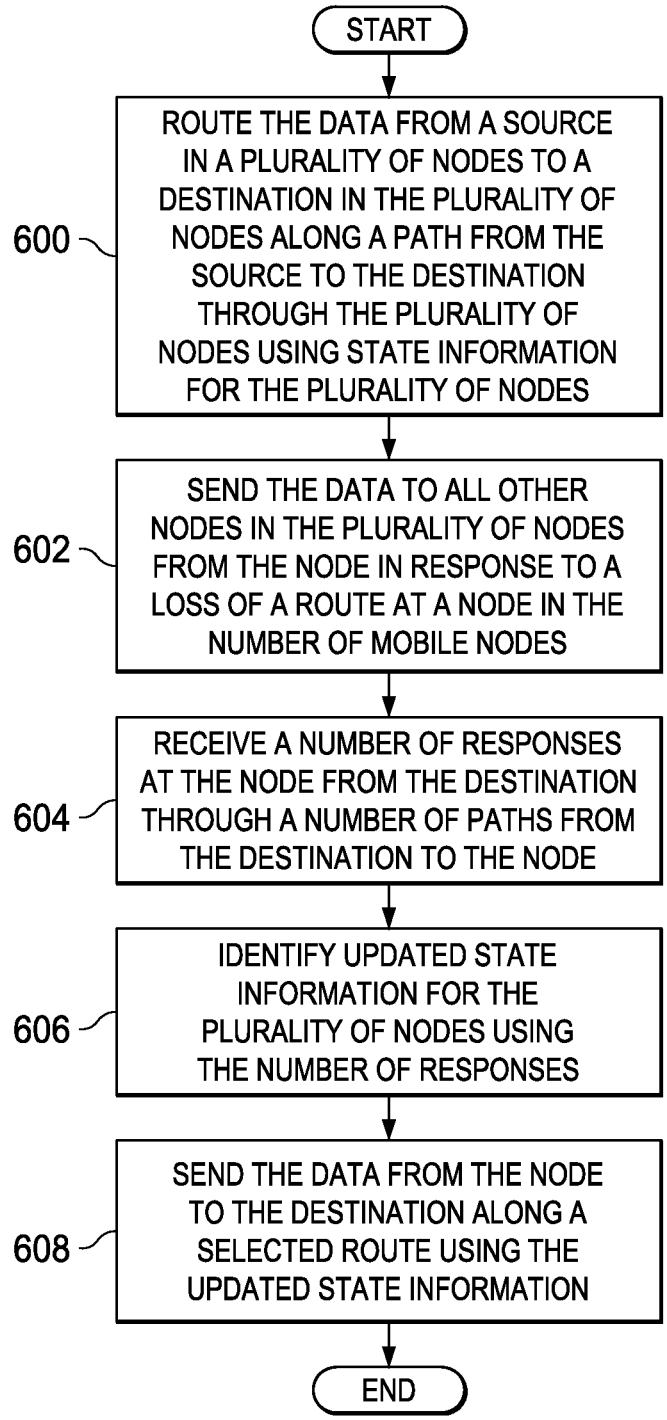
FIG. 6 is an illustration of a flowchart in accordance with an advantageous embodiment.

With reference now to FIG. 6, an illustration of a flowchart is depicted in accordance with an advantageous embodiment. The process illustrated in FIG. 6 may be implemented in wireless network 102 in FIG. 1.

The process begins by routing the data from a source in a plurality of nodes to a destination in the plurality of nodes along a path from the source to the destination through the plurality of nodes using state information for the plurality of nodes (operation 600). The plurality of nodes forms the network and comprises a number of static nodes and a number of mobile nodes.

Thereafter, the process sends the data to all other nodes in the plurality of nodes from the node in response to a loss of a route at a node in the number of mobile nodes (operation 602). The route is a segment of the path from the source to the destination. The route is from the node to another node. The process performed in operation 602 may also be referred to as flooding the plurality of nodes with the data.

The process receives a number of responses at the node from the destination through a number of paths from the destination to the node (operation 604). The number of responses takes the form of a number of data acknowledgements. Each data acknowledgement includes an identification of the source, an identification of the destination, an identification of the node from which the data acknowledgement was received, and an identification of the sequence number for the data acknowledgement.

Next, the process identifies updated state information for the plurality of nodes using the number of responses (operation 606). The updated state information indicates a new state for the node. The new state is one of a proactive state and an on-demand state in these examples. Thereafter, the process sends the data from the node to the destination along a selected route using the updated state information (operation 608), with the process terminating thereafter. In operation 608, the process sends the data to the destination along the selected route using one of a proactive routing protocol and an on-demand routing protocol.

Figure 7:
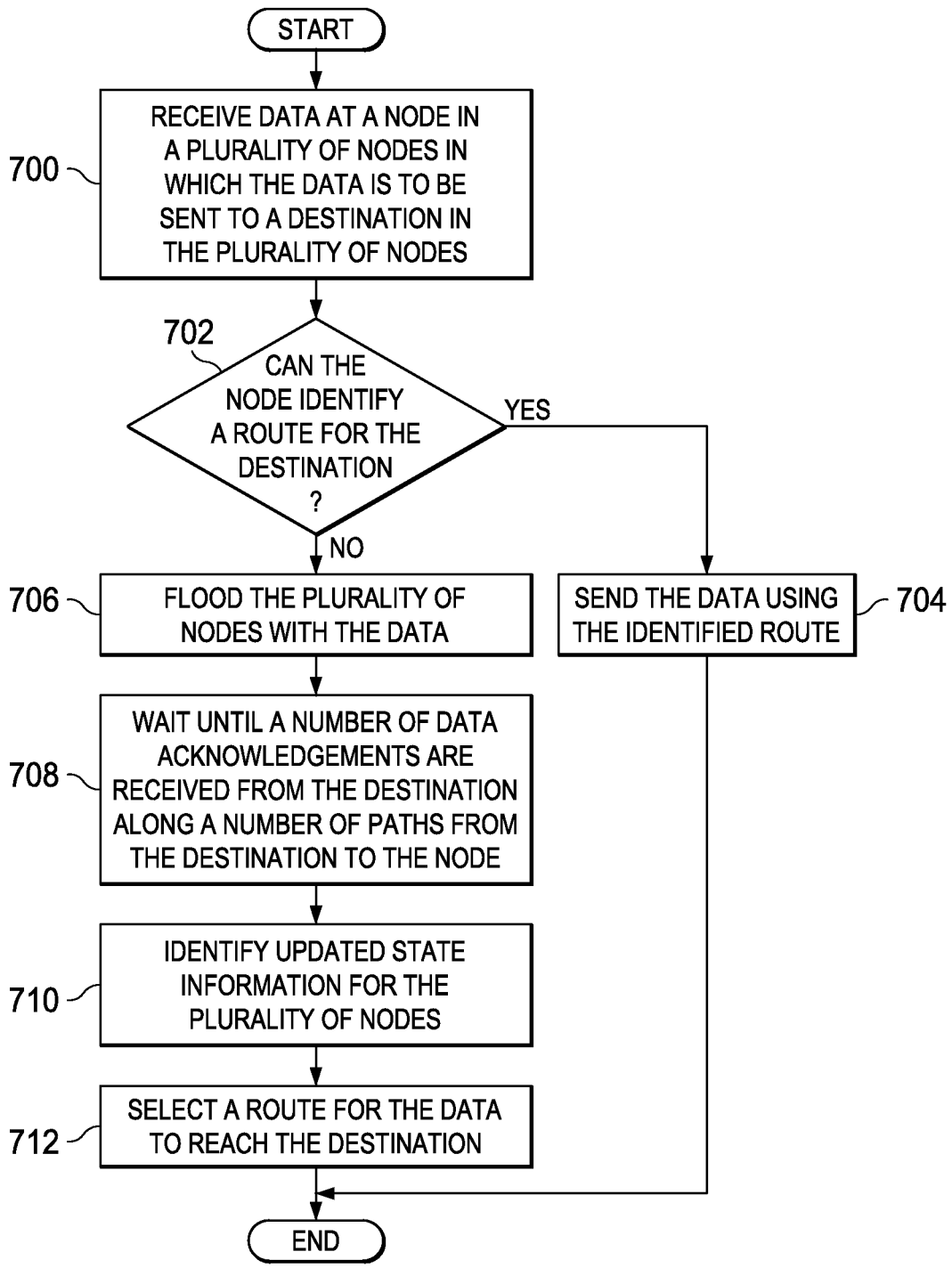
FIG. 7 is an illustration of a flowchart in accordance with an advantageous embodiment.

With reference now to FIG. 7, an illustration of a flowchart is depicted in accordance with an advantageous embodiment. The process illustrated in FIG. 7 may be implemented in wireless network 102 in FIG. 1. In particular, this process may be implemented using node 138 in FIG. 1.

The process begins by receiving data at a node in a plurality of nodes in which the data is to be sent to a destination in the plurality of nodes (operation 700). Thereafter, a determination is made as to whether the node can identify a route for the destination (operation 702). In operation 702, the route is another node in the plurality of nodes. Further, the route is one segment in the path for the data from the node to the destination.

If the node can identify the route, the process sends the data using the identified route (operation 704), with the process terminating thereafter. Otherwise, the process floods the plurality of nodes with the data (operation 706). Thereafter, the node waits until a number of data acknowledgements are received from the destination along a number of paths from the destination to the node (operation 708).

In response to receiving the number of data acknowledgements, the node identifies updated state information for the plurality of nodes (operation 710). Thereafter, the node selects a route for the data to reach the destination (operation 712), with the process terminating thereafter. The selected route is the selection of another node in the plurality of nodes to which to send data. In operation 712, the selected route may be used anytime the node receives data that is to be sent to the destination. This selected route may be used until a loss of the selected route occurs.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method, system, and computer program product for routing data in a network. In one advantageous embodiment, data is routed from a source in a plurality of nodes to a destination in the plurality of nodes along a route through the plurality of nodes using state information for the plurality of nodes. The plurality of nodes forms a network and comprises a number of static nodes and a number of mobile nodes. In response to a loss of the route at a node in the number of mobile nodes, the data is sent to all other nodes in the plurality of nodes from the node. A number of responses is received from at least a portion of all the other nodes in the plurality of nodes at the node. Updated state information for the node is identified using the number of responses. The data is sent from the node to the destination along a selected route using the updated state information.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for routing data in a network, the method comprising:
   routing the data from a source in a plurality of nodes to a destination in the plurality of nodes along a path from the source to the destination through the plurality of nodes using state information for the plurality of nodes, wherein
      the plurality of nodes forms the network and comprises a number of static nodes and a number of mobile nodes, and
      the state information identifies a state of a node for a route as one of a flooding state for using a flooding protocol, a proactive state for using a proactive protocol, and an on-demand state for using an on-demand protocol with respect to the destination;
   responsive to a loss of a route at the node in the number of mobile nodes, sending the data to all other nodes in the plurality of nodes from the node, wherein the route is a segment of the path;
   receiving a number of data acknowledgements at the node from the destination through a number of paths from the destination to the node;
   identifying updated state information for the plurality of nodes using the number of data acknowledgements to change the state of the node for the route with respect to the destination; and
   sending the data from the node to the destination along a selected route for the node using the updated state information.

2. The method of claim 1, wherein the step of sending the data to the all other nodes in the plurality of nodes from the node comprises:
   flooding the plurality of nodes with the data such that the data is received at the all other nodes in the plurality of nodes.

3. The method of claim 1 further comprising:
   changing the state of the node for the route from a current state to the flooding state in response to the loss of the route at the node in the number of mobile nodes.

4. The method of claim 1, wherein the step of identifying the updated state information for the plurality of nodes using the number of data acknowledgements comprises:
   identifying a new state for the node using the number of data acknowledgements, wherein the new state is one of an on-demand state and a proactive state; and
   changing a state of the node from a flooding state to the new state prior to sending the data from the node to the destination along the selected route for the node.

5. The method of claim 1, wherein each data acknowledgment in the number of data acknowledgments includes a first identifier, a second identifier, a third identifier, and a fourth identifier.

6. The method of claim 1, wherein the step of identifying the updated state information for the plurality of nodes using the number of data acknowledgements comprises:
   identifying a state of each node as one of a proactive state, an on-demand state, and a flooding state with respect to the destination.

7. The method of claim 1 further comprising:
   identifying a number of potential routes from the node to the destination using the updated state information, wherein a potential route in the number of potential routes is from the node to another node in the plurality of nodes; and selecting one of the number of potential routes to form the selected route for the node.

8. The method of claim 7, wherein the step of selecting the one of the number of potential routes to form the selected route for the node comprises:

selecting the one of the number of potential routes to form the selected route for the node using a policy.

9. The method of claim 7, wherein the step of selecting the one of the number of potential routes to form the selected route for the node comprises:

randomly selecting the one of the number of potential routes to form the selected route for the node.

10. The method of claim 1, wherein the step of routing the data from the source in the plurality of nodes to the destination in the plurality of nodes along the path from the source to the destination through the plurality of nodes using the state information for the plurality of nodes comprises:

routing the data from the source to the destination along the path through the plurality of nodes in the network using the state information for the plurality of nodes and a proactive routing protocol, wherein a portion of nodes along the path are in a proactive state.

11. The method of claim 1, wherein the plurality of nodes form at least one of a static network and a mobile network in the network.

12. The method of claim 11, wherein the mobile network is a mobile ad hoc network.

13. The method of claim 1, wherein the plurality of nodes includes at least one of a router, a switch, a gateway, a firewall, a computer, a processor unit, a personal digital assistant, and a cellular phone.

14. A system comprising:

a source in a plurality of nodes, wherein the plurality of nodes forms a network and comprises a number of mobile nodes and a number of static nodes;

a destination in the plurality of nodes in the network, wherein data is routed from the source to the destination along a path through the plurality of nodes in the network; and a node in the number of mobile nodes in the plurality of nodes, wherein the node comprises state information that identifies a state of the node for a route as one of a flooding state for using a flooding protocol, a proactive state for using a proactive protocol, and an on-demand state for using an on-demand protocol with respect to the destination and the node is configured to send the data to all other nodes in the plurality of nodes in the network in response to a loss of a route at the node, wherein the route is a segment of the path;

receive a number of data acknowledgements at the node from the destination through a number of paths from the destination to the node;

identify updated state information for the plurality of nodes using the number of data acknowledgements to change the state of the node for the route with respect to the destination; and send the data to the destination along a selected route using the updated state information.

15. The system of claim 14, wherein in being configured to send the data to the all other nodes in the plurality of nodes in the network in response to the loss of the route at the node, the node is configured to flood the plurality of nodes with the data such that the data is received at the all other nodes in the plurality of nodes.

16. The system of claim 14, wherein the node is further configured to change the state of the node for the route from a current state to the flooding state in response to the loss of the route at the node in the number of mobile nodes.

17. The system of claim 14, wherein in being configured to identify the updated state information for the plurality of nodes using the number of data acknowledgements, the node is configured to identify a new state for the node using the number of data acknowledgements, wherein the new state is one of an on-demand state and a proactive state; and change a state of the node from a flooding state to the new state prior to sending the data from the node to the destination along the selected route.

18. The system of claim 14, wherein each data acknowledgment in the number of data acknowledgments includes a first identifier, a second identifier, a third identifier, and a fourth identifier.

19. The system of claim 14, wherein in being configured to identify the updated state information for the plurality of nodes using the number of data acknowledgements, the node is configured to identify a state of each node in at least a portion of the all other nodes in the plurality of nodes as one of a proactive state, an on-demand state, and a flooding state with respect to the destination.

20. The system of claim 14, wherein the node is further configured to identify a number of potential routes from the node to the destination using the updated state information, wherein a potential route in the number of potential routes is from the node to another node in the plurality of nodes; and select one of the number of potential routes to form the selected route for the node.

21. The system of claim 20, wherein in being configured to select the one of the number of potential routes to form the selected route for the node, the node is configured to select the one of the number of potential routes to form the selected route for the node using a policy.

22. The system of claim 20, wherein in being configured to select the one of the number of potential routes to form the selected route for the node, the node is configured to randomly select the one of the number of potential routes to form the selected route for the node.

23. The system of claim 14, wherein the data is routed from the source to the destination along the path through the plurality of nodes in the network using the updated state information for the plurality of nodes and a proactive routing protocol, wherein a portion of nodes along the path are in a proactive state.

24. The system of claim 14, wherein the plurality of nodes form at least one of a static network and a mobile network in the network.

25. The system of claim 24, wherein the mobile network is a mobile ad hoc network.

26. The system of claim 14, wherein the plurality of nodes includes at least one of a router, a switch, a gateway, a firewall, a computer, a processor unit, a personal digital assistant, and a cellular phone.

27. A computer program product for routing data in a network, the computer program product comprising:

a computer readable storage medium that is non-transitory;

program code, stored on the computer readable storage medium, for responsive to a loss of a route at a node in a plurality of nodes in the network, sending the data to all other nodes, wherein the data is being routed along a path from a source in the plurality of nodes to a destination in the plurality of nodes, wherein the plurality of nodes comprises a number of mobile nodes and a number of static nodes, wherein the route is a segment in the path, and wherein the node comprises state information that identifies a state of the node for a route as one of a flooding state for using a flooding protocol, a proactive state for using a proactive protocol, and an on-demand state for using an on-demand protocol with respect to the destination;

program code, stored on the computer readable storage medium, for receiving a number of data acknowledgements at the node from the destination through a number of paths from the destination to the node;

program code, stored on the computer readable storage medium, for identifying updated state information for the plurality of nodes using the number of data acknowledgements to change the state of the node for the route with respect to the destination; and program code, stored on the computer readable storage medium, for sending the data to the destination along a selected route using the updated state information.

28. The method of claim 1, wherein the state is defined per destination at each node of the plurality of nodes.

* * * * *